US009369677B2

(12) United States Patent
Jarvis

(10) Patent No.: US 9,369,677 B2
(45) Date of Patent: Jun. 14, 2016

(54) IMAGE ASSISTANCE FOR INDOOR POSITIONING

(71) Applicant: QUALCOMM TECHNOLOGIES INTERNATIONAL, LTD., Cambridge (GB)

(72) Inventor: Murray Robert Jarvis, Stapleford (GB)

(73) Assignee: QUALCOMM Technologies International, LTD., Cambridge (GB)

( * ) Notice: Subject to any disclaimer, the term of this patent is extended or adjusted under 35 U.S.C. 154(b) by 589 days.

(21) Appl. No.: 13/689,933

(22) Filed: Nov. 30, 2012

(65) Prior Publication Data

US 2014/0152809 A1 Jun. 5, 2014

(51) Int. Cl.
*H04N 7/18* (2006.01)
*G01S 5/02* (2010.01)
*G01S 5/16* (2006.01)

(52) U.S. Cl.
CPC ............. *H04N 7/18* (2013.01); *G01S 5/0252* (2013.01); *G01S 5/0263* (2013.01); *G01S 5/16* (2013.01)

(58) Field of Classification Search
CPC ........... H04N 7/18; G01S 5/16; G01S 5/0263; G01S 5/0252
USPC .......................................................... 348/135
See application file for complete search history.

(56) References Cited

U.S. PATENT DOCUMENTS

| 7,486,800 B2 * | 2/2009 | Asama ............... G06K 9/00335 348/350 |
| 8,000,660 B1 | 8/2011 | Woleben et al. |
| 8,499,038 B1 * | 7/2013 | Vucurevich ................... 709/204 |
| 2008/0130949 A1 * | 6/2008 | Ivanov ................... H04N 7/181 382/103 |
| 2009/0043504 A1 * | 2/2009 | Bandyopadhyay .... G01C 17/38 701/469 |
| 2009/0092282 A1 | 4/2009 | Avidan et al. |
| 2011/0237188 A1 | 9/2011 | Sen |

(Continued)

FOREIGN PATENT DOCUMENTS

| CN | 101635057 | 1/2010 |
| CN | 102654916 | 9/2012 |

(Continued)

OTHER PUBLICATIONS

Werner et al., "Indoor Positioning Using Smartphone Camera", 2011 International Conference on Indoor Positioning, and Indoor Navigation (IPIN), Sep. 2011.

(Continued)

*Primary Examiner* — Thai Tran
*Assistant Examiner* — Nien-Ru Yang
(74) *Attorney, Agent, or Firm* — The Marbury Law Group, PLLC

(57) ABSTRACT

A method for tracking collector devices in an indoor area associated with imaging devices and RF signal sources covering the area includes generating aspects of a plurality of coarse position tracks of the collector devices based on RF signal measurements obtained by the collector devices from the RF signal sources. Imaging devices capture image frames of the collector devices in the indoor area which are then processed in order to determine aspects of a plurality of fine position tracks of the collector devices. The server and the collector device communicate with each other and match aspects of at least one of the fine position tracks to the aspects of the coarse position track of the communicating collector device in order to determine the precise location of the collector device in the indoor area.

15 Claims, 7 Drawing Sheets

(56) References Cited

U.S. PATENT DOCUMENTS

| | | | | |
|---|---|---|---|---|
| 2011/0250903 | A1* | 10/2011 | Huang et al. | 455/456.1 |
| 2012/0237086 | A1* | 9/2012 | Kourogi et al. | 382/103 |
| 2012/0275522 | A1 | 11/2012 | Kim et al. | |
| 2013/0230208 | A1* | 9/2013 | Gupta et al. | 382/103 |
| 2013/0317944 | A1* | 11/2013 | Huang | G01S 5/0252 705/26.61 |

FOREIGN PATENT DOCUMENTS

| | | |
|---|---|---|
| EP | 0508706 | 10/1992 |
| GB | 24498800 | 7/2013 |
| JP | H10341431 | 1/1993 |
| JP | 2009296029 | 12/2009 |
| KR | 20090016673 | 2/2009 |
| WO | WO 2012/060393 | 5/2012 |

OTHER PUBLICATIONS

Karlekar et al., "Positioning, Tracking and Mapping for Outdoor Augmentation", 9th IEEE International Symposium on Mixed and Augmented Reality, Oct. 2010.

GB Search Report issued in related GB Application No. 1320234.6, dated May 23, 2014.

GB Search Report issued in related GB Application No. 1320234.6, dated Sep. 2, 2014.

Search Report for GB Appln. No. 1308296.1, dated Feb. 10, 2014.

* cited by examiner

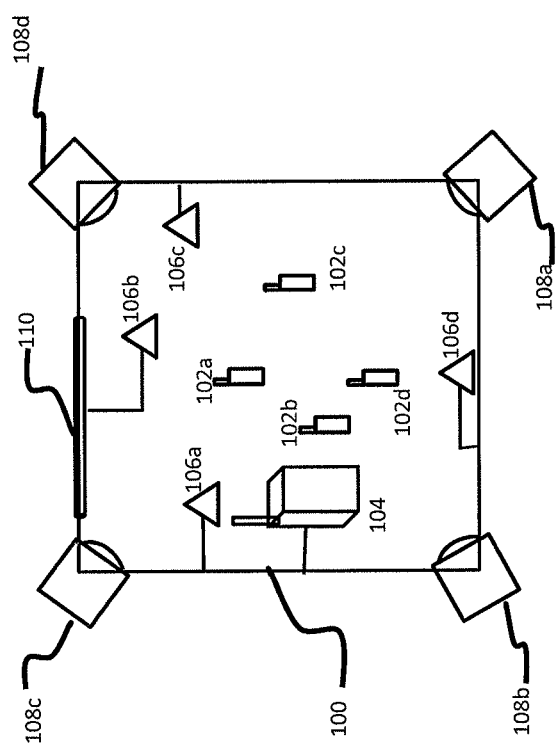

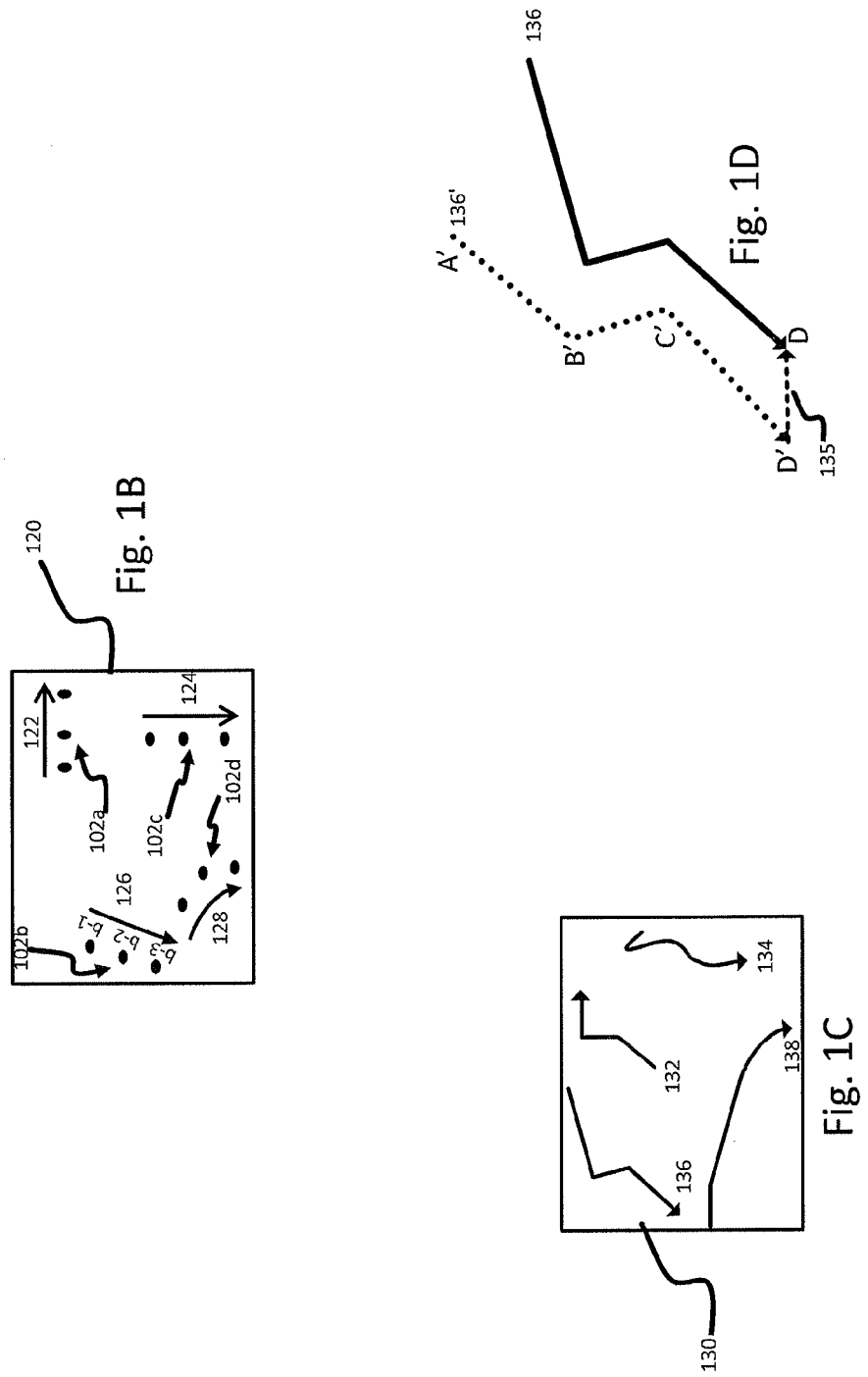

Server

Collector Device

ID FOR INDOOR
IMAGE ASSISTANCE FOR INDOOR POSITIONING

FIELD OF INVENTION

The present invention is directed toward indoor positioning of mobile devices and in particular to systems and methods for tracking mobile devices using a combination of image processing and coarse location data providing trajectory information of the mobile devices.

BACKGROUND

Outdoor positioning of a collector device (e.g. a mobile device) can be achieved using Global Navigation Satellite System (GNSS). In conventional GNSS, the mobile device may collect information from the satellites along a line-of-sight. The collected information may then be used to compute the location (longitude, latitude, altitude) of the mobile device to within a few meters. A mobile device may also determine its position by triangulating signals from cell-phone transmitters.

SUMMARY OF THE INVENTION

An example embodiment of the present invention includes a method for tracking collector devices in an indoor area associated with and imaging devices. The method includes generating aspects of a plurality of coarse position tracks of the collector devices based on sensor measurements made by the collector devices. Imaging devices capture image frames of the collector devices in the indoor area which are then processed in order to determine aspects of a plurality of fine position tracks of the collector devices. The server and the collector device communicate with each other and match aspects of at least one of the fine position tracks to the aspects of the coarse position track of the communicating collector device in order to determine the precise location of the collector device in the indoor area.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letter "n" may represent a non-specific number of elements. Also, lines without arrows connecting components may represent a bi-directional exchange between these components. According to common practice, the various features of the drawings are not drawn to the scale. Also, the dimensions of the various features are arbitrarily expanded or reduced for clarity. Included in the drawings are the following figures:

FIG. 1A is a block diagram depicting one embodiment of a system for tracking a collector device.

FIG. 1B is a diagram depicting video stream showing multiple trajectories of collector devices captured by imaging device(s) as shown in FIG. 1A.

FIG. 1C is a diagram showing multiple fine position tracks corresponding to the trajectories of the collector devices as shown in FIG. 1B.

FIG. 1D is a diagram illustrating the matching of a coarse position track to one of the fine position tracks as shown in FIG. 1C.

DETAILED DESCRIPTION

Figure 2B:
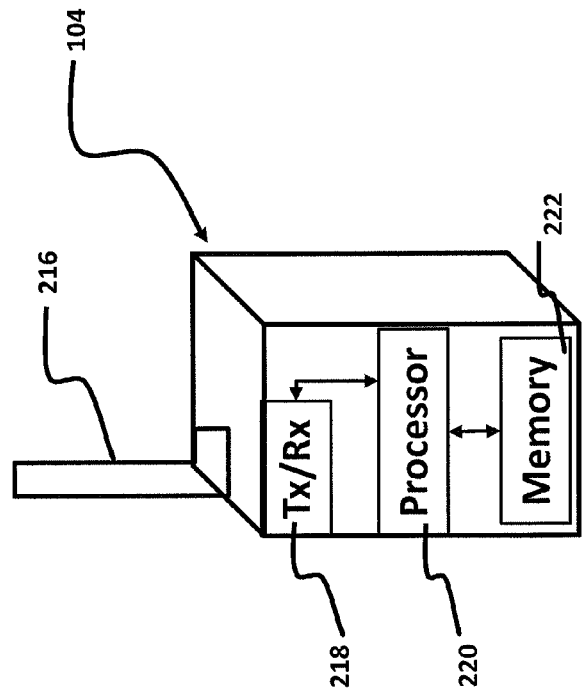
FIG. 2B is a block diagram depicting one embodiment of a server.

Outdoor positioning of a collector device can be achieved by employing GNSS or by triangulating signals from cell-phone transmitters. For indoor positioning, however, GNSS, and or cell triangulation may not be suitable because it may be difficult to receive the signals. In addition, cell triangulation may pose further difficulties because of antenna characteristics, reflections and obstructions in the indoor environment. Embodiments of the invention overcome the limitations of indoor positioning by tracking a collector device in an environment covered by a set of imaging devices (video or still-frame) and monitoring RF signal characteristics of RF signal sources. Particularly, a collector device can obtain aspects of a coarse position track based on measurement sets including signal characteristics of RF signal sources in the indoor area and sensor data indicating the displacement and direction of the collector device along a path. In addition to signal measurements, aspects of the coarse position track may include, for example, left turn, right turn, u-turn, acceleration, deceleration, etc, performed by the collector device. For example, the some of these aspects of coarse position tracks may be derived from the signals provided by pedestrian dead reckoning (PDR) devices.

The collector device may also obtain aspects of its fine position track based on images by the imaging devices covering the indoor area. Specifically, imaging devices can capture multiple digital images, each composed of a plurality of pixels that can be statistically mapped to positions. Groups of contiguous pixels in image frames that move together are considered to be one object. Standard techniques, such as using comparison of an image frame including an object with another image frame with an empty scene, pixel differences from frame to frame, object recognition, etc., may be used to determine motion and eventually the trajectory information of collector device(s) or person(s) carrying collector device(s) in the indoor area, for example.

A server may receive the fine position tracks from the imaging devices and aggregate the fine position tracks, which may include combining overlapping fine position tracks captured by at least two different imaging devices, into a single fine position track, for example. Alternatively, the fine position tracks may be aggregated by the imaging devices.

The collector device can further communicate with the server, based on the coarse position data, receive the fine position track information and match aspects of the coarse position track to the aspects of one of the fine position tracks in order to locate the position of the collector device accurately. The aspects of the fine position tracks may be within the uncertainty of the coarse position tracks, for example.

In one example, the indoor environment may be a retail store, and a person in possession of a collector device may anonymously locate his or her position accurately, based on the coarse and the fine position tracks, as described above. The person can further navigate to a desired location by making accurate turns based on the aspects of the provided position tracks and indoor maps.

Position information may be collected for persons or objects (e.g. mobile equipment). The object or person typically includes a collector device. In the materials that follow, the term "object" includes a person.

FIG. 1A illustrates a system 100 for determining the location of a collector device 102 in accordance with an embodiment of the present invention. The illustrated system includes a plurality of collector devices 102 a-n (only four devices 102a-d are shown in FIG. 1A), a plurality of imaging devices 108 a-n (only four imaging devices 108a-d are shown in FIG. 1A) coupled to a server 104, and a plurality of RF signal sources 106 a-n (only four RF signal sources 106 a-d are shown in FIG. 1A). The example imaging devices 108 a-d are coupled to the server 104 via the network 110 (wired or wireless).

The RF signal sources may be, for example, any terrestrial RF transmitter or transmitter/receiver of wireless or RF signals, for example, IEEE 802.11 access points. The collector devices may be, for example, mobile telephones, or IEEE 802.11 devices that are configured to receive the RF signals transmitted by the RF signal sources 106 a-d. The RF signals may include information, for example, access point identifier (e.g. media access control identifier (MAC ID), received signal strength indication (RSSI), time or phase offsets of received signals and/or round-trip delay time (RTT), which may be processed by the collector device 102 in order to determine aspects of a coarse position track.

Each collector device 102 may also or alternatively include sensors that determine a coarse position track by comparing the respective RSS values for the signal sources 106 to a set of access point "fingerprint" data indicating the relative strengths of the sources at different positions. The coarse positions may also be determined using trilateration of the sources 106 or using the cell identity of nearby cellular transmitters.

The imaging devices 108 may be, for example, networked cameras, that are configured to capture still-frames or video. In one embodiment, the imaging devices 108 may be monochrome or color cameras. Alternatively, the imaging devices 108 may be infra-red cameras or a combination of camera types.

Image processing may also be performed by the imaging devices in order to determine the aspects of the fine position tracks of the collector devices. This may reduce the burden of data on the network 110. Alternatively, image processing may be performed by the server 104, for example.

The server 104 may be configured to receive the fine position track information from the imaging devices 108 via the network 110. Alternatively, if the server 104 is configured to perform image processing in order to determine the fine position track information, it may then directly receive image frames from the imaging devices. The server 104 may send the fine position track information to a collector device 102, for example, upon responding to the requesting collector device 102.

FIG. 1B illustrates respective positions of four objects derived from a video stream including multiple image frames captured by an imaging device 108a. Alternatively, the video stream of FIG. 1B may be generated by multiple imaging devices, for example, imaging devices 108 a-d. The video stream 120 includes fine position trajectories of the collector devices. As another alternative, video stream 120 may include fine position trajectories of objects. In one example, as shown in FIG. 1B, trajectory 126 depicts the motion of the collector device 102b, or a person (not shown) in possession of the collector device 102b, captured in different image frames. For example, in one image frame, the collector device 102b may be at a point b-1 at a specific time. In another instance, the collector device 102b may move to a next point b-2 captured in a different image frame. Yet in another time, the image of the collector device at a point b-3 may be captured in an other image frame. Thus, different image frames capturing the positions, b-1, b-2 and b-3 of the collector device 102b at different times, may be consecutively processed in order to generate the trajectory 126. Trajectories may be generated, for example, when the image frames are processed. Image processing may include comparison of an image frame including a collector device to an image frame with an empty scene, pixel differences between consecutive frames, object recognition, etc., in order to determine the motion of a collector device or an object. For example, 122, 124, 126, 128 are the trajectories of the collector devices 102a, 102b, 102c and 102d, respectively. A trajectory of an object may be a segment of the corresponding track, for example.

In an another embodiment, an object may be in a still position. As such, maintenance of trajectory information may be terminated after a predetermined amount of time (e.g. 1 to 5 minutes). Tracking may resume when the object moves again.

FIG. 1C illustrates the fine position tracks of the collector devices corresponding to the trajectories of FIG. 1B. For example, a fine position track set 130 including fine position tracks 132, 134, 136, and 138 correspond to the fine position trajectories, 122, 124, 126 and 128, respectively. The fine position tracks are generated based on the calibration of the imaging devices such that each pixel in an image stream is assigned to known coordinates.

The coordinates may be based upon a standard coordinate system such as WGS84, for example, providing longitude, latitude and altitude information.

Biometric or other information about the objects, for example, height, color or size may further assist in the mapping of the image position to an actual position (with coordinates). The tracks can be aggregated locally at a control point and sent to server 104. For example, the indoor area may have several floors with each floor having a control point. Thus, each of the control points of the respective floors collects the aspects of the fine position tracks from the imaging devices covering the respective floor. In this example, the control points of each floor may then aggregate the aspects of the fine position tracks and send them to the server 104.

Alternatively, the tracks may be sent to the server 104 directly via the network 110, for example. Communications to and from the server 104 may take place over secure links.

Calibration of the imaging devices may be implemented in order to assign a position to each pixel in an image. Calibration of the imaging devices may be performed during a setup stage and is described in detail below. Calibration points may be chosen in the indoor area for calibrating all of the cameras, for example. The calibration points, captured in an image by the specific camera, for example, may be assigned to known geometrical coordinates (latitude, longitude, altitude). Thereafter, any specific point in the image may be interpolated and mapped back to a corresponding specific location in the indoor area covered by the image. This results in the cameras being calibrated to the same coordinate system.

In an another embodiment, each imaging device 108 covering the indoor area may be calibrated individually with its own set of coordinates. For example, each camera may track an object (e.g., a person walking) in the indoor area and generate aspects of a fine position track based on its calibrated coordinate system. The fine position tracks of the object generated in different coordinate systems may then be sent to the server 104. The server may identify corresponding objects in the images, may process the aspects of the tracks and warp the different coordinate systems into a common coordinate system, using for example, affine or parametric transformations. In an another example, the server may relay back a set of reference images captured in the common coordinates to the different imaging devices. The imaging devices may then warp their coordinate systems to the common coordinate system and perform further tracking based on the common coordinate system, for example.

Alternatively, calibration of the imaging devices may not be necessary, if stereo images are captured by the imaging devices having known locations and focal lengths.

As described above, at the point of aggregation, duplicate tracks from respectively different images may be combined into a single track. For example, trajectories (not shown) similar to the trajectory 122 as shown in FIG. 1B of the collector device 102*a*, may be generated by the imaging devices 108*a* and 108*b* based on different viewing perspectives. However, the tracks (not shown) corresponding to the trajectory 122, generated by the imaging devices 108*a* and 108*b* are similar to each other. As such, the tracks may be combined into a single track 132, depicting the path taken by the collector device 102*a*, as shown in FIG. 1C. The combining process may further include the server 104 averaging fine position tracks in a common coordinate system received from the imaging devices 108*a* and 108*b* in order to generate a single track 132, for example.

The collector device 102 may be time calibrated with the imaging devices 108 and the server 104, providing a time accuracy between 0.5 and 2 seconds, for example. The time calibration may be based on NTP, for example, and may be periodically updated. Further, the fine position tracks may be received for a predetermined amount of time. For example, the collector device 102 may send a request to the server 104 for the aspects of the fine position tracks that may had been generated within the last 5 seconds-10 minutes, from the time of the request.

FIG. 1D illustrates correction of a coarse position track 136' to a fine position track 136. At first, aspects of a coarse position track 136' may be calculated by a collector device based on measurement sets including signal characteristics of RF signal sources and sensor data indicating the displacement and direction of the collector device. The RF signal measurements may include signal strengths of the access points 106*a*, 106*d*, for example. The RF signal measurements may also or alternatively include the roundtrip delay time. Each collector device may generate, sensor data, to indicate, for example, a displacement of the collector device 102*a* along a path and acceleration or deceleration including turns. The example collector device may calculate displacement, acceleration, and environmental information based on its present and/or previous location along the path. This information may be generated by circuitry internal to the collector device, including, without limitation, a Hall-effect or micro electro-mechanical systems (MEMS) magnetometer, a MEMS accelerometer, an optical or MEMS gyroscope, a pedometer, or a MEMS barometer. Thus, the collector device may generate successive displacement vectors derived from sensor data, for example. Each displacement vector may specify a displacement along the x, y, z axes. For example, the collector device 102*a*, or an object in possession of the collector device 102*a*, may calculate the track 136' based on PDR.

As shown in FIG. 1D, the collector device 102*a* travels along a path 136' and reaches point A' and collects a time stamp and RSSI and RTT data based on communication with the RF signal sources 106*a*, 106*d*, for example. Collector device 102*a* may collect sensor data from a previous point on the route 136' (not shown) to point A'. Collector device then travels to point B' while collecting sensor data. At point B', the collector device 102*a* further collects RSSI, RTT data and time stamp data from 106*a*, 106*d*. The collector device 102*a* then travels to point C' and generates sensor data and RSSI or RTT data between the points B' and C' in a similar fashion. As such, these measurement sets may be collected and processed by the collector device 102*a* in order to generate the aspects of the coarse position track 136'. Alternatively, the collector devices may send the measurement sets to the server 104. The server 104 may then generate the aspects of coarse position tracks, for example.

The coarse position track 136' may be an estimate because, for example, the collector device 102*a* may not have a clear signal path to one or both of the RF signal sources, as such, the signal characteristics at points A', B', C', D' may be attenuated. In addition, RTT or arrival time may be erroneous due to multipath. Furthermore, the sensor data may not be accurate, as the sensor modules may not be calibrated properly, or due to the presence of materials, that can disrupt the functionality of the sensor modules (e.g. ferromagnetic materials may disrupt an electronic compass). Thus, in order to accurately determine aspects of a track, the collector device may utilize further assistance, for example, image assistance in the form of fine position track information, as described above.

The collector device 102*a*, or an object in possession of the collector device 102*a*, after determining the coarse position track 136', may then receive the fine position track set 130 and compare the aspects (e.g. time-stamped turns) of the fine position tracks (included in the track set 130) with the coarse position track 136'. Once an unambiguous track has been identified, for example, the fine position track 136, a coarse point D' in the coarse position track 136' may snap to a fine position D of the fine position track 136, once a correction is applied, as shown by the arrow 135. This may reduce the uncertainty range during the next image assistance request to the server, for example.

Figure 2A:
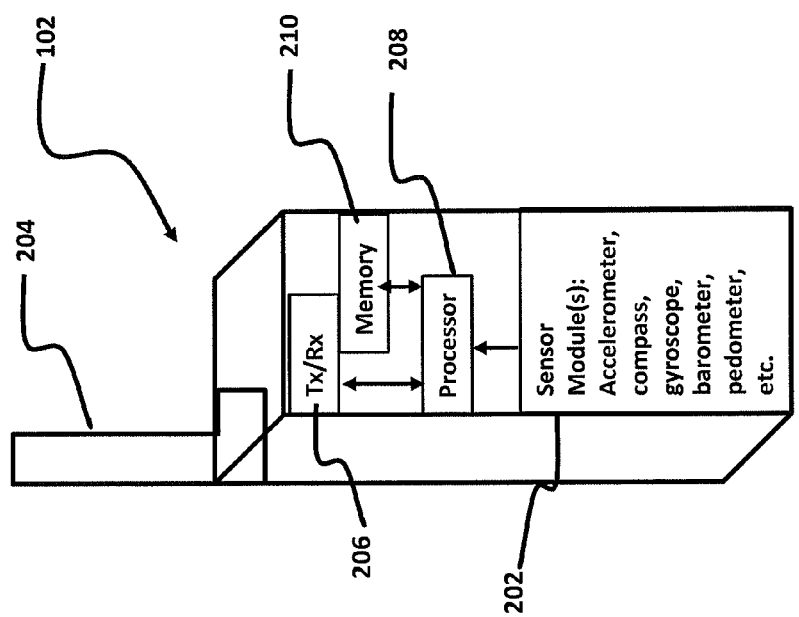
FIG. 2A is a block diagram showing one embodiment of a collector device.

FIG. 2A depicts a collector device 102 in accordance with aspects of the present invention. The example collector device includes at least one antenna 204, receiver or transmitter/receiver 206, processor 208, memory 210 and sensor module(s) 202.

Memory 210 may store instructions for the processor 210 and data used by the collector device 102.

Processor 208 may be used by the collector device 102 to process data collected or monitored in order to determine displacements of the collector device, for example. In addition, the processor 208 may control other functions of the collector device 102. For example, if the collector device is a mobile telephone, the processor 208 may process audio information or data transmitted through the communication channels.

In general, the collector device 102 includes receiver or transmitter/receiver 206 to monitor the signal characteristics of the RF signal sources 106 via the antenna 204 and, in one embodiment of the invention, transmits aspect of the coarse position tracks to the server 104. Alternatively, the transmitter/receiver 206 may transmit the signal characteristics of the RF signal sources to the sever 104 via the antenna 204. The collector device 102 may transmit or receive information contemporaneously, at predetermined times or as requested by the server 108. The transmit/receiver 206, for example, may also receive the fine position tracks from the sever 104. In yet another embodiment, the transmitter/receiver 206 may not include a transmitter, for example, the receiver 206 (not shown) may receive the fine position tracks from the sever 104 and match its position to the fine position tracks using internally maintained data.

Sensor module(s) 202 may include, for example, an accelerometer, a gyroscope, a compass or magnetometer, a barometer, pedometer, a camera and/or other components for determining movement (e.g., direction and distance) of the collector device 102. The RF receiver of the transmitter/receiver 206 may also be used as a sensor to detect the RSSI of the RF signal sources.

FIG. 2B is a schematic illustration depicting one example embodiment of a server 104. In this embodiment, the server 104 communicates with the collector device 102 using its transmitter/receiver 218 via the antenna 216.

The transmitter/receiver 218 may be used to receive other messages as well. For example, the transmitter/receiver 218 may be configured to receive messages from the collector device 102, for example, the signal characteristics of the RF signal sources, in order to determine aspects of coarse position tracks of the collector devices. Alternatively, the transmitter/receiver 218 may be configured to receive coarse position track information of the collector devices 102. The server 104 may also be configured to communicate with the imaging devices and receive images or analyzed position information from the imaging devices. For example, the server 104 may receive raw image frames from the imaging devices 108. Alternatively, it may receive the fine tracks or the aspects of fine position tracks directly from the imaging devices 108, over the network 110.

The processor 220 included in the server 104 may process the captured image frames received from the imaging devices 108 in order to determine the aspects of the fine position tracks corresponding to the objects in the captured images, in one exemplary embodiment. The processor 220 may also be configured to process data received from the collector device 102. Transmitter/receiver 218 may transmit fine position track information in response to requests from the collector device 102. The processor 220 may further process track information in order to map the aspects of the fine position tracks to the aspects of the coarse position tracks, for example. Memory 222 may store the raw images received from the imaging devices, in one example. It may also store the RF signal measurement, displacement data and time stamps received from the collector devices in order to calculate the coarse position tracks.

Figure 3:
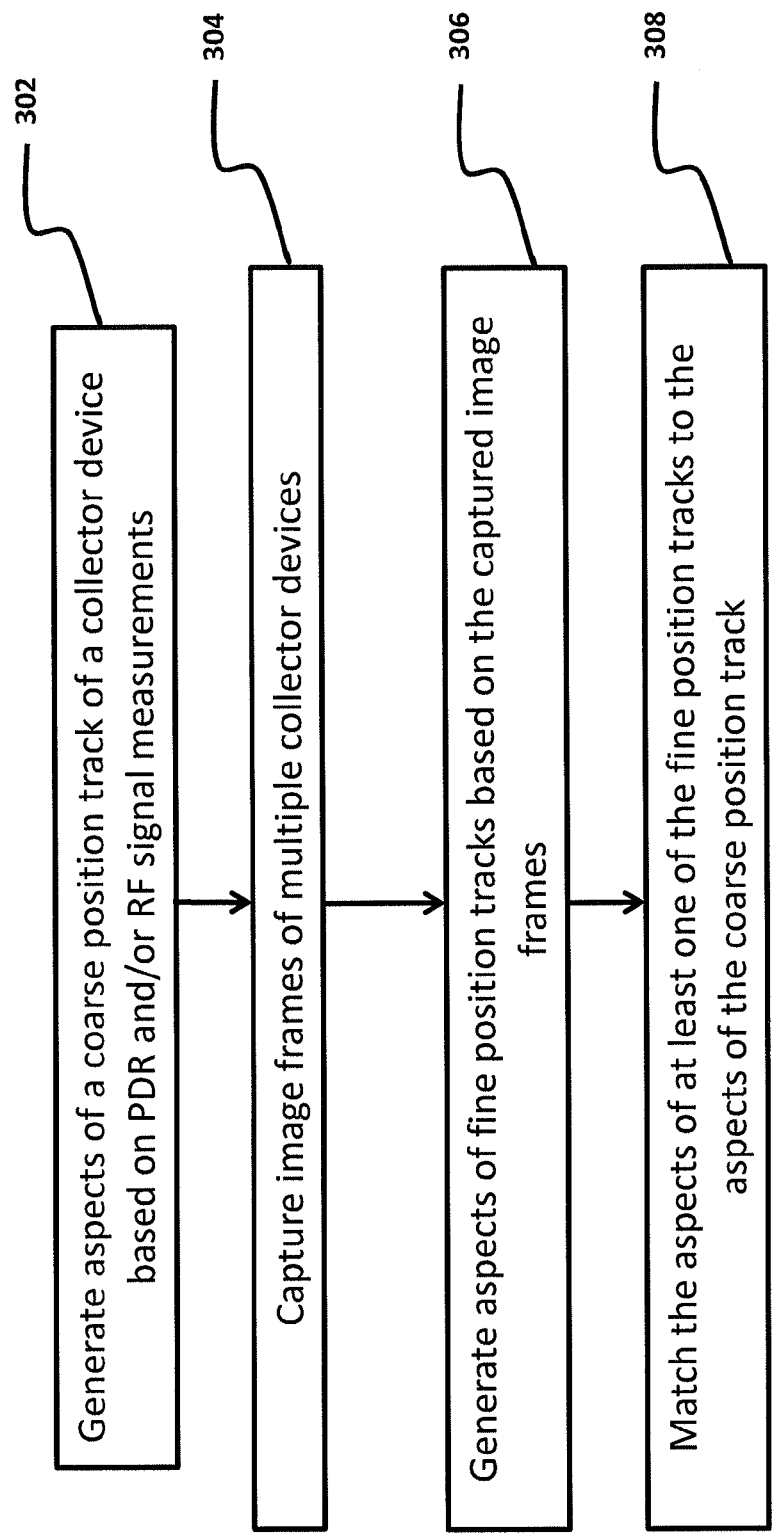
FIG. 3 is a flow-chart diagram depicting the high level processes for determining a location of a collector device.

FIG. 3 is a flow diagram outlining the high level steps used for tracking a collector device 102 in an indoor environment as shown in FIG. 1A, for example. At step 302, aspects of a coarse position track of a collector device are generated. For example, the aspects of the tracks may be based on the measurement sets including RF signal characteristics of the RF signal sources 106, and/or displacement and direction data obtained from the PDR sensors. Further, aspects of the coarse position tracks may be generated by the collector device 102, or alternatively, by the server 104. At step 304, multiple image frames including at least a collector device, or an object in possession of a collector device to be tracked in the indoor environment, are captured by the imaging devices, for example.

At step 306, captured image frames of step 304 are processed to generate aspects of fine position tracks of the collector devices. Processing of the images can be performed by the imaging devices and the tracks or aspects of the tracks sent to the server 104, or alternatively, images may be sent to the sever 104, where the images are processed in order to generate aspects of the fine position tracks of the collector devices.

At step 308, aspects of one of the fine position tracks are matched with the aspects of one of the coarse position tracks generated at step 302, for example. The collector device may match the aspects of the fine position tracks with those of the coarse position tracks. Alternatively, the server 104 may be configured to perform the matching operation. In such case, the server 104 may receive aspects of the coarse positions directly from the collector device, for example.

Figure 4:
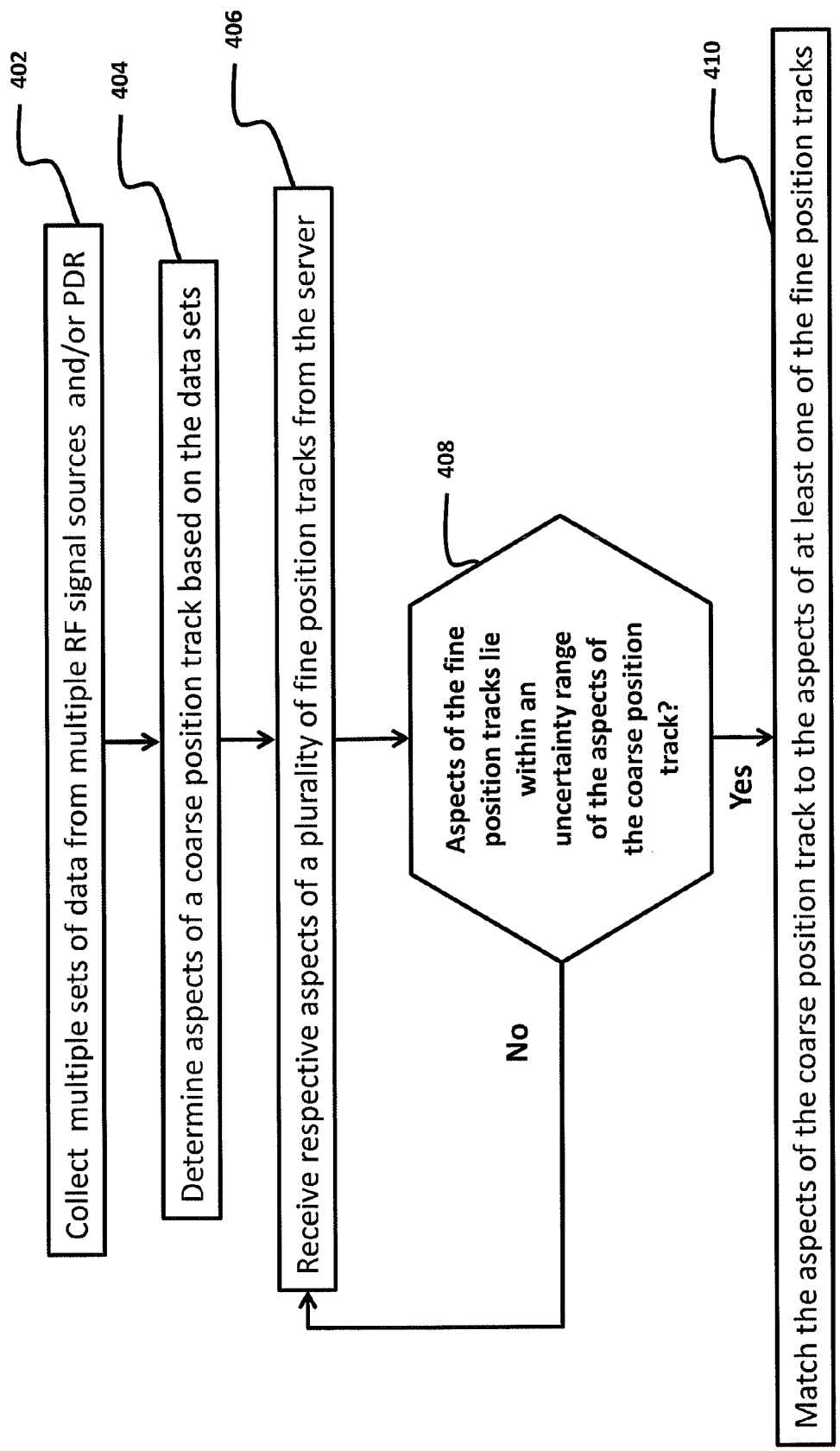
FIG. 4 is a flow-chart diagram of an embodiment depicting a method of a collector device receiving position information for determining a precise location of the collector device, as shown in FIG. 3.

FIG. 4 is a flow diagram depicting a more detailed view of the method used by a collector device 102 in order to accurately determine its position in an indoor environment. At step 402, the collector device 102 may be configured to monitor the RF signal sources 106 and/or the PDR sensors 202 and collect RF signal and sensor measurements including, for example, RTT, RSSI, motion or sensor information and time stamp information. At step 404, the collector device may be further configured to process the data collected at step 402, in order to determine aspects of a coarse position track. For example, as described above, and as shown in FIG. 1D, track 136' may be generated based on PDR. The coarse position track 136' may have an accuracy of 5-15 m range, for example.

Alternatively, server 104 may be configured to generate the aspects of the coarse position, for example, as mentioned above in the discussion for step 302.

The collector device 102 may also be configured to receive aspects of the fine position tracks from the server 104, for example, as shown at step 406.

The collector device may also be configured to extract aspects of a coarse position track, for example, by image processing. For example, the collector device may compare time-stamped inflection points with the turns made in the coarse position track. Based on the comparison, it may then extract and record those features.

At step 408, the collector device 102 may further check whether the aspects of the fine position tracks, received at step 406, lie within an uncertainty range of the aspects of the coarse position tracks determined at step 404. For example, the collector device 102 may receive the track set 130 containing the fine position tracks, as shown in FIG. 1C, from the server 104. The collector device 102 may then determine that the aspects of the fine position track 136 lie within the uncertainty of the aspects of track 136', as shown in FIG. 1D. Whereas, fine position track 132 is not within the uncertainty range of the coarse position track 136', for example. Thus, at step 410, the collector device 102 may then match the aspects of the coarse position track 136' to the aspects of the fine position track 136. The matching process may include a step of applying a correction algorithm, for example, in order to snap the aspects of the coarse position track 136' to the aspects of the fine position track 136, as shown in FIG. 1D. This may further reduce the uncertainty range, for example. This may result in substantially reduced data transfer during the next request for image assistance from the server 104. Alternatively, if a wrong position track is locked in during the step 410, the uncertainty range may be increased for example, in order to receive a wider range of fine position tracks, thus providing a recovery mechanism.

The received fine position tracks may be used to calibrate PDR sensors. The PDR sensors may then more accurate, making it more reliable and may further make it possible to extend the time before another request for image assistance is made to the server 104, for example.

Figure 5:
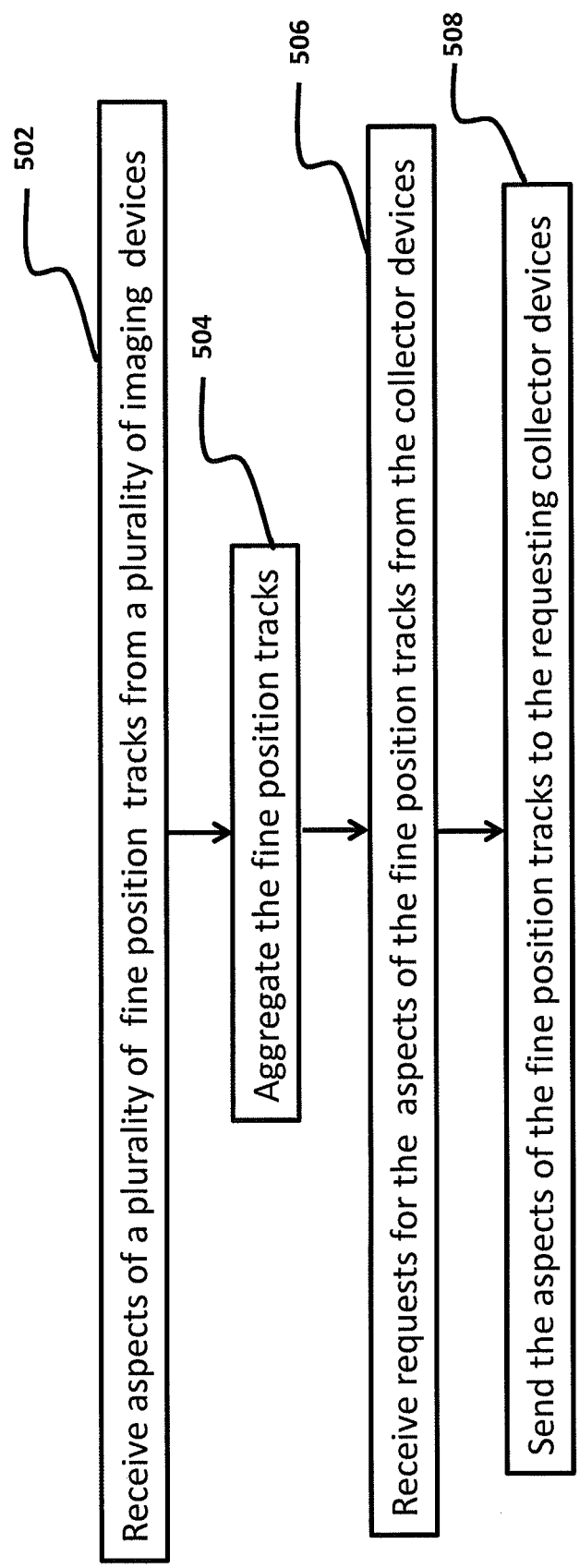
FIG. 5 is a flow-chart diagram of an embodiment describing a method of a server receiving and transmitting position information, as illustrated in FIG. 3.

FIG. 5 is a flow diagram showing a more detailed view of the method used by a server 108 providing assistance for accurately determining a fine position of a collector device in an indoor environment.

At step 502, the server 104 may be configured to receive aspects of a plurality of fine position tracks of collector devices 102 from a plurality of imaging devices 106 covering the indoor environment. Alternatively, server 104 may be configured to process raw image frames received from the imaging devices 106 and generate aspects of the fine position tracks. Furthermore, or alternatively, server 104 may receive raw image frames with time-stamps, or aspects of the fine position tracks with corresponding time labels.

As described above, the fine position tracks may be based on different coordinate systems. Alternatively, the tracks may be warped into a common coordinate system by the server 104, for example.

At step 504, server 104 may then aggregate the fine position tracks, for example. As described earlier, the aggregating process may further include server 104 combining partial tracks and/or averaging similar fine position tracks from different imaging devices, based on a common coordinate system, in order to generate a single track 132. Alternatively, fine position tracks may be aggregated at separate control points and then sent to the server 104.

At step 506, the server 104 communicates with the collector devices 102. For example, the server 104 may receive requests for the aspects of the fine position tracks from the collector devices 102. At step 508, server 104 may then respond to the request by sending a track set 120, for example, as shown in FIG. 1C, to the requesting collector device.

Figure 6:
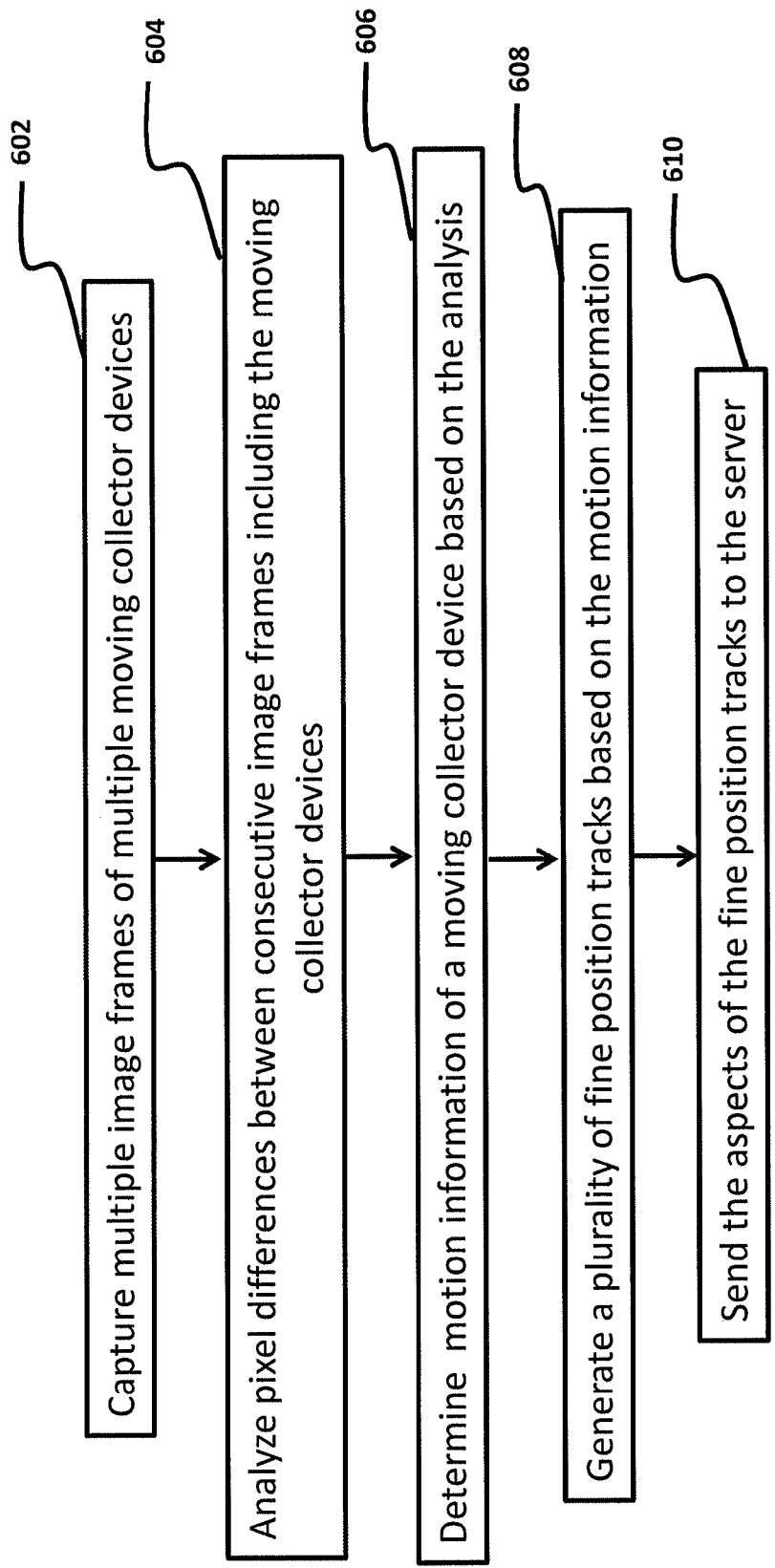
FIG. 6 is a flow-chart diagram of an embodiment depicting a method of an imaging device capturing image frames, as shown in FIG. 3.

FIG. 6 is a flow diagram illustrating the method implemented by an imaging device used to assist in tracking a collector device accurately in an indoor environment. At step 602, the imaging devices 108 may be configured to capture multiple images of the collector devices 102, as shown in FIG. 1A. For example, multiple image frames of the collector device 102a may be captured by the imaging devices 108a and 108b providing different perspectives. As described above, these images may be in the same or in different coordinate systems. At step 604, imaging devices 108 may analyze pixel differences in consecutively captured image frames in order to determine trajectories of the moving object. For example, analysis of pixel differences may include further image processing of the captured image frames.

At step 606, based on the analysis of step 604, and as shown in FIG. 1B, motion information of a moving collector device, or trajectories, are determined based on the captured images of the collector devices. In one example of FIG. 1B, the trajectories may be generated by a single imaging device 108a. In yet another example, the trajectories may be generated by multiple imaging devices 108 capturing images in different coordinate systems, or alternatively, capturing images and warping the captured images to a common coordinate system.

At step 608, the imaging device may be configured to generate a plurality of fine position tracks based on the trajectories determined at step 606. As described above, for example, aspects of the fine position tracks may be derived from an average value of similar tracks with identical coordinate systems. Alternatively, the tracks may be warped into a common coordinate system and then similar tracks are averaged to generate a corresponding single track for each of the trajectories, for example.

At step 610, the imaging devices may be configured to send aspects of the fine position tracks to the server 104. Alternatively, the imaging devices 108 may be configured to send the trajectories to the server 104, for example.

The server 104 may then process the trajectories to generate the aspects of the corresponding fine position tracks and send the aspects of the fine position tracks to a requesting collector device. The requesting collector device may be configured to match the aspects of the coarse position tracks to the aspects of at least one of the fine position tracks in order to determine its fine position.

The invention has been described in terms of example embodiments. It is contemplated that modifications to these embodiments may be made within the scope of the appended claims.

What is claimed is:

1. A method for determining a fine position of a collector device associated with a server and a plurality of imaging devices coupled to the server, the method comprising the collector device:
   collecting multiple sets of sensor measurements from at least one sensor associated with the collector device to determine a coarse position track of the collector device;
   identifying at least turns of the coarse position track;
   time-stamping and storing data representing each identified turn in the coarse position track;
   receiving from the server data representing at least respective time-stamped turns of a plurality of fine position tracks associated with moving objects in images obtained by the plurality of imaging devices;
   determining a matching fine position track for the collector device among the plurality of fine position tracks that are associated with the moving objects in the images obtained by the plurality of imaging devices by comparing at least the stored data representing the time-stamped turns of the coarse position track to the received data representing the time stamped turns of the plurality of fine position tracks until the matching fine position track is identified; and
   determining a position of the collector device from the matching fine position track.

2. The method of claim 1, wherein the at least one sensor associated with the collector device includes a pedestrian dead reckoning (PDR) sensor and wherein identifying at least the turns of the coarse position track comprises using PDR sensor data to quantify a path that includes the turns of the coarse position track.

3. The method of claim 2, further comprising calibrating the PDR sensor by conforming the stored data representing the time stamped turns of the coarse position track to the received data representing the turns of the matching fine position track.

4. The method of claim 1, further including a plurality of RF signal sources, wherein collecting the multiple sets of sensor measurements from the at least one sensor associated with the collector device comprises collecting sensor measurement data representing respective signal strengths of at least a portion of the plurality of RF signal sources.

5. The method of claim 1, wherein receiving the data representing at least the respective time-stamped turns of the plurality of fine position tracks comprises receiving data representing each of the plurality of fine position tracks labeled with respective time-stamps.

6. The method of claim 1, further comprising time-calibrating the collector device with the server and the imaging devices.

7. The method of claim 1, wherein receiving the data representing at least the respective time-stamped turns of the plurality of fine position tracks comprises receiving the data representing at least the respective time-stamped turns of the plurality of fine position tracks over a secure link from the server.

8. The method of claim 1, wherein comparing the stored data representing the time-stamped turns of the coarse position track to the received data representing the time-stamped turns of the plurality of fine position tracks comprises determining whether the received data representing the time-stamped turns of at least one of the plurality of fine position tracks matches the stored data representing the time-stamped turns of the coarse position track within a region of uncertainty.

9. The method of claim 1, wherein the turns include at least one of a left turn, right turn, or a u-turn.

10. A method for determining a fine position of a collector device associated with a server and a plurality of imaging devices coupled to the server, the method comprising the server:
receiving a plurality of fine position tracks from the plurality of imaging devices;
aggregating corresponding ones of the plurality of fine position tracks by combining data representing the corresponding ones of the plurality of fine position tracks from the plurality of imaging devices to generate a single aggregated fine position track representing a path followed by a respective collector device;
identifying turns in the plurality of aggregated fine position tracks and extracting time-stamped data representing each of the identified turns from each of the plurality of aggregated fine position tracks; and
receiving requests from collector devices for the data representing the turns of the aggregated fine position tracks and sending at least the time-stamped data representing the turns of the plurality of aggregated fine position tracks to the requesting collector devices.

11. The method of claim 10, wherein receiving the requests from the collector devices comprises receiving time-stamped data representing at least turns of a plurality of coarse position tracks provided by the plurality of collector devices respectively.

12. The method of claim 10, wherein aggregating the corresponding ones of the plurality of fine position tracks comprises aggregating overlapping fine position tracks, captured by at least two different imaging devices of the plurality of imaging devices, into a single fine position track.

13. The method of claim 12, wherein aggregating the overlapping fine position tracks comprises averaging the overlapping fine position tracks.

14. The method of claim 12, wherein the overlapping fine position tracks, captured by at least two different imaging devices, are in respective coordinate systems and the method further comprises transforming at least one of the overlapping fine position tracks such that the overlapping fine position tracks have a common coordinate system.

15. The method of claim 14, wherein transforming at least one of the overlapping fine position tracks comprises sending reference images in the common coordinate system to the plurality of imaging devices.

* * * * *